United States Patent
Li et al.

(10) Patent No.: US 11,194,065 B2
(45) Date of Patent: Dec. 7, 2021

(54) TESTING LEAKING RAYS

(71) Applicant: Shanghai Neusoft Medical Technology Co., Ltd., Shanghai (CN)

(72) Inventors: Shuangxue Li, Shanghai (CN); Yiming Zhu, Shanghai (CN); Jun Yu, Shanghai (CN)

(73) Assignee: Shanghai Neusoft Medical Technology Co., Ltd., Shanghai (CN)

( * ) Notice: Subject to any disclaimer, the term of this patent is extended or adjusted under 35 U.S.C. 154(b) by 8 days.

(21) Appl. No.: 16/824,341

(22) Filed: Mar. 19, 2020

(65) Prior Publication Data

US 2020/0217973 A1 Jul. 9, 2020

Related U.S. Application Data

(62) Division of application No. 15/915,265, filed on Mar. 8, 2018, now Pat. No. 10,698,124.

(30) Foreign Application Priority Data

Mar. 8, 2017 (CN) .......................... 201710134957.9

(51) Int. Cl.
*G01T 7/00* (2006.01)
*G01N 23/046* (2018.01)
*G01T 1/29* (2006.01)

(52) U.S. Cl.
CPC .............. *G01T 7/00* (2013.01); *G01N 23/046* (2013.01); *G01T 1/2985* (2013.01)

(58) Field of Classification Search
CPC ....... G01N 23/046; G01T 1/2985; G01T 7/00; A61B 6/58; A61N 5/1075; G01R 29/0814
See application file for complete search history.

(56) References Cited

U.S. PATENT DOCUMENTS

| | | | |
|---|---|---|---|
| 10,743,827 B2 * | 8/2020 | Kumar | A61B 6/467 |
| 2009/0232282 A1 | 9/2009 | Belson | |
| 2010/0176315 A1 | 7/2010 | Kisakibaru | |
| 2010/0329427 A1 | 12/2010 | Takae | |
| 2016/0025658 A1 | 1/2016 | Georgeson | |
| 2019/0290230 A1 * | 9/2019 | Keil | A61B 6/588 |

FOREIGN PATENT DOCUMENTS

JP 11214192 A 8/1999

* cited by examiner

*Primary Examiner* — Marcus H Taningco
(74) *Attorney, Agent, or Firm* — Fish & Richardson P.C.

(57) ABSTRACT

Devices and methods of testing leaking rays are provided. In one aspect, a device includes a first rotary arm configured to rotate around a first rotary axis, a second rotary arm rotatably connected with the first rotary arm and configured to rotate around a second rotary axis, a probe mounted on a rotating end of the second rotary arm and configured to measure a numerical value of leaking rays at each position at which the probe stays, a mounting base rotatably connected with the second rotary arm and configured to mount a ray source component, a first driving unit configured to drive the first rotary arm to rotate around the first rotary axis, and a second driving unit configured to drive the second rotary arm to rotate around the second rotary axis, the first rotary axis being perpendicular to the second rotary axis.

20 Claims, 5 Drawing Sheets

TESTING LEAKING RAYS

CROSS REFERENCE TO RELATED APPLICATIONS

This application is a divisional application of U.S. patent application Ser. No. 15/915,265 filed on Mar. 8, 2018, which claims priority to Chinese Patent Application No. 201710134957.9 entitled "Method and Device for Testing Leaking Rays" filed on Mar. 8, 2017. The contents of these applications are hereby incorporated by reference in their entireties.

TECHNICAL FIELD

The present disclosure relates to testing leaking rays.

BACKGROUND

Ray machines are widely applied to medical equipment such as computed tomography (CT) machines. The ray machine may include a ray source component including a ray source and a beam limiter. Ray leaking test on the ray source component is a necessary test for the ray machine.

According to requirements of relevant regulations for leaking ray test, a required measurement range is a surface of a sphere with a radius being 1 meter and a center of the sphere being a focus of a ray source of the tested ray source component.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

The present disclosure provides methods and devices for testing leaking rays in a way that a leaking ray test can be implemented at costs as low as possible.

One aspect of the present disclosure features a device for testing leaking rays, including: a first rotary arm configured to rotate around a first rotary axis; a second rotary arm rotatably connected with the first rotary arm and configured to rotate around a second rotary axis; a probe mounted on a rotating end of the second rotary arm and configured to measure a numerical value of leaking rays at each position at which the probe stays; a mounting base rotatably connected with the second rotary arm and configured to mount a ray source component; a first driving unit configured to drive the first rotary arm to rotate around the first rotary axis; and a second driving unit configured to drive the second rotary arm to rotate around the second rotary axis. The first rotary axis is perpendicular to the second rotary axis, the first rotary axis and the second rotary axis intersect with a body axis of the probe at a focus of a ray source in the ray source component, and the probe is at a predetermined distance from the focus.

The first driving unit can be configured to position the first rotary arm at a first rotation position, and the second driving unit can be configured to position the second rotary arm at a second rotation position. The second rotary arm can be provided with a counterweight for balance at an end opposite to the rotating end on the second rotary arm.

In some implementations, the first rotary arm is of an L shape and includes a transverse part and a vertical part. The transverse part is hinged to the mounting base, and the vertical part is hinged to the second rotary arm and perpendicular to the second rotary axis of the second rotary arm. The device can further include a column and a support plate disposed at a top of the column. A central axis of the column can coincide with the first rotary axis of the first rotary arm, a lower end of the column can be hinged to the transverse part of the first rotary arm, and the mounting base can be detachably disposed on the support plate.

In some implementations, the first rotary arm is of a bend-line shape and includes a first arm extending from top to bottom and a second arm bent from a lower end of the first arm toward the first rotary axis. An upper end of the first arm can be hinged to the second rotary arm, and an end of the second arm close to the first rotary axis can be connected with a rotating shaft extending upward and downward, and an axis of the rotating shaft extending upward and downward can be collinear with the first rotary axis.

In some examples, the device further includes a supporting beam at a side of the rotating shaft, and the supporting beam is provided with at least two rotating plates spaced apart in an upward and downward direction, and the rotating plates are respectively connected rotationally to an upper end and a lower end of the rotating shaft. In some cases, the supporting beam is further provided with a connecting plate extending toward the first rotary axis, the connecting plate can be provided with a supporting shaft disposed coaxially with the rotating shaft and independent of the rotating shaft, and the mounting base can be disposed at a top of the supporting shaft. In some cases, the supporting beam is further provided with an accessory mounting plate disposed away from the first rotary axis and configured to mount an accessory for testing leaking rays. In some cases, the device further includes an electrical mounting plate at a side face of the supporting beam far away from the rotating shaft, and the electrical mounting plate is configured to mount a power source and a control circuit board for testing leaking rays.

Another aspect of the present disclosure features a method of testing leaking rays, including: providing a probe in an initial position at a predetermined distance from a focus of a ray source in a ray source component to be tested for leaking rays; controlling the probe to move on a longitudinal dimension and a latitudinal dimension by taking the focus as a center of a sphere in a plurality of first motion periods such that positions at which the probe stays seamlessly form a first hemispherical surface, and measuring a numerical value of leaking rays at each of the positions at which the probe stays in the first hemispherical surface through the probe; flipping the ray source component; and controlling the probe to move on the longitudinal dimension and the latitudinal dimension by taking the focus as the center of the sphere in a plurality of second motion periods such that positions at which the probe stays seamlessly form a second hemispherical surface, and measuring a numerical value of leaking rays at each of the positions at which the probe stays in the second hemispherical surface through the probe, the second hemispherical surface and the first hemispherical surface being combinable to be a full spherical surface. Adjacent positions of the probe in the longitudinal dimension and the latitudinal dimension can be overlapped with each other to form a seamless measurement area.

In some implementations, controlling the probe to move on the longitudinal dimension and the latitudinal dimension by taking the focus as the center of the sphere in the plurality of the first motion periods includes: in each of the first motion periods, controlling the probe to rotate by a first predetermined angle for a plurality of times on the latitudinal dimension such that the positions at which the probe stays form a seamless latitudinal arc; and controlling the probe to rotate by a second predetermined angle on the longitudinal dimension.

The latitudinal arc can be a semicircular arc or a full circular arc. The focus can be taken as the center of the sphere, and a point on a largest-diameter circle of the spherical surface can be set to be an initial position of the probe. The method can further include: in each of the first motion periods, controlling the probe to reversely rotate to a starting point of the latitudinal arc when the latitudinal arc is formed. In some cases, controlling the probe to rotate by the second predetermined angle on the longitudinal dimension includes: controlling the probe to rotate by the second predetermined angle in a selected rotation direction on the longitudinal dimension.

In some implementations, controlling the probe to move on the longitudinal dimension and the latitudinal dimension by taking the focus as the center of the sphere in the plurality of the second motion periods includes: in each of the second motion periods, controlling the probe to rotate by the first predetermined angle for a plurality of times on the latitudinal dimension such that the positions at which the probe stays form a seamless latitudinal arc; and controlling the probe to rotate by the second predetermined angle in a selected rotation direction on the longitudinal dimension.

The focus can be taken as the center of the sphere, and a point on the largest-diameter circle of the spherical surface can be taken as the initial position of the probe. The method can further include: in each of the second motion periods, controlling the probe to reversely rotate to a starting point of the latitudinal arc when the latitudinal arc is formed.

The details of one or more examples of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

In an example, 18 square probes complying with relevant regulations may be arranged in a staggered manner into a semicircular probe group so that a distance between each of the probes and a center of circle of the semicircular probe group is 1 meter. In a manner that a diameter of the semicircular probe group is taken as a rotation axis, a ray source component may be installed on the rotation axis and a focus of a ray source of the ray source component is coincident with the center of circle of the probe group. The probe group is located at a side of a horizontal direction of the ray source component. To perform a test during a measuring process, the ray source component may be rotated around the rotation axis by 360 degrees while keeping the probe group stationary. Since a bracket is installed under the ray source component and the bracket can affect reception of rays leaked by the probe, only the measurement of an upper half is valid. Thus, only the test of a hemispherical surface can be completed. The ray source component may be flipped entirely by 180 degrees, for example, an arrangement of the ray source being below a beam limiter of the ray source component is changed into an arrangement of the ray source being above the beam limiter. And, the ray source component may be rotated by 360 degrees around the rotation axis to complete the test of the other hemispherical surface. Thus, the test of a full spherical surface is completed by two measurements.

In another example, the semi-circular probe group may be located just above the ray source component. During a measuring process, with the probe group being stationary, the ray source component may be rotated around the rotation axis by 180 degrees to realize a test of a hemispherical surface, may be flipped entirely by 180 degrees, for example, the arrangement of the ray source being below the beam limiter is changed into the arrangement of the ray source being above the beam limiter, and may be rotated around the rotation axis by 180 degrees to complete the test of the other hemispherical surface. Thus, the test of the full spherical surface can be completed by two times of measurements.

In the above two examples, the device for testing leaking rays includes 18 probes used for measurement and all of these probes are desired to be paid calibrated once every three months. Also, the purchase cost and the subsequent maintenance cost of the device are both high.

In an example of the present disclosure, to realize leaking ray test at a low cost as possible, a device for testing leaking rays can include one probe complying with relevant regulations. There is a predetermined distance from the probe to the focus of the ray source of the tested ray source component. The predetermined distance may be set to be 1 meter according to the relevant regulations. During a test, the tested ray source component is kept stationary, and the measurement of the full spherical surface can be realized by controlling motion and stop positions of the probe.

Figure 1:
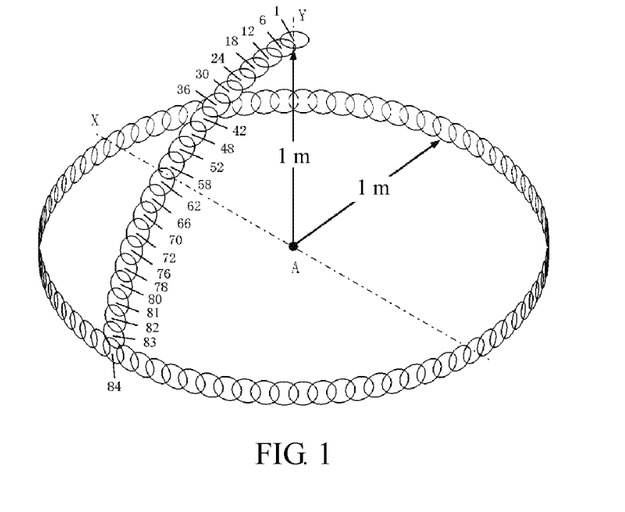
FIG. 1 is a schematic diagram illustrating probe motion in a method of testing leaking rays according to an example of the present disclosure.
Figure 2:
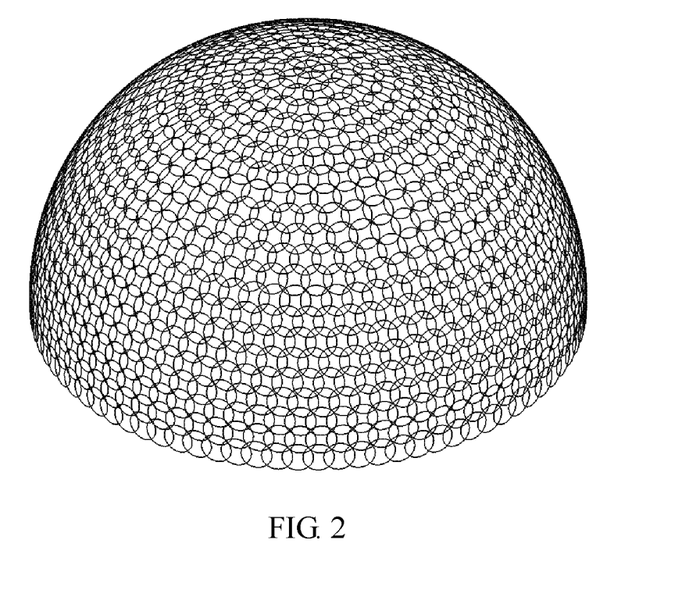
FIG. 2 is a schematic diagram illustrating a hemispherical surface formed by moving a probe according to FIG. 1.

FIG. 1 is a schematic diagram illustrating probe motion in a method of testing leaking rays according to an example of the present disclosure. FIG. 2 is a schematic diagram illustrating a hemispherical surface formed by a probe moving according to FIG. 1. Motion and a stop position of a probe in an example of the present disclosure are described in combination with FIGS. 1 and 2.

In FIGS. 1 and 2, a probe may move along two motion dimensions. Two axes passing through a focus A of a ray source may be set as rotation axes. The two axes are perpendicular to each other, which may include a vertical axis Y and a horizontal axis X. The probe may move in a latitudinal dimension that rotates around the vertical axis Y and in a longitudinal dimension that rotates around the horizontal axis X respectively.

In an example, the probe may rotate a plurality of circles in the latitudinal dimension with 360 degrees for each circle, and rotate 90 degrees in longitudinal dimension.

In each motion period, the probe may first rotate around the vertical axis Y a plurality of times with a first predetermined angle for each time. When the probe rotates to 360 degrees, the motion of the probe in the latitudinal dimension ends in the motion period. The probe rotates by a second predetermined angle around the horizontal axis X to change the position of the probe in the longitudinal dimension to start a next motion period.

When the probe rotates around the horizontal axis X to 90 degrees a plurality of times, all positions at which the probe stays exactly forms a hemispherical surface seamlessly, as shown in FIG. 2.

After the hemispherical surface is formed, the ray source component is entirely rotated by 180 degrees, the previous process is repeated to form the other hemispherical surface seamlessly. Thus, the two measurement results are combined into a full spherical surface.

In an example, the probe may rotate a plurality of circles in the latitudinal dimension with 180 degrees for each circle, and rotate 180 degrees in the longitudinal dimension.

In each motion period, the probe may first rotate around the vertical axis Y for a plurality of times with a first predetermined angle for each time. When the probe rotates around the vertical axis Y to 180 degrees, the probe motion in the latitudinal dimension ends in the motion period. The probe rotates by a second predetermined angle around the horizontal axis X to change the position of the probe in the longitudinal dimension to start a next motion period.

When the probe rotates around the horizontal axis X a plurality of times to 180 degrees, all positions at which the probe stays exactly forms a hemispherical surface seamlessly, as shown in FIG. 2.

After the hemispherical surface is formed, the ray source component is entirely rotated by 180 degrees, and the previous process is repeated to form the other hemispherical surface seamlessly. The two measurement results are combined into a full spherical surface.

The rotation angle of the ray source component is not limited to 180 degrees. In an example, the hemispherical surface formed after the ray source component is rotated and the hemispherical surface formed before the component is rotated can be combined to be a full spherical surface.

In FIGS. 1 and 2, each small circle represents a position at which the probe stops. Each numeral mark in FIG. 1 indicates the number of positions at which the probe may stay in each circle in the latitudinal direction. As shown in FIG. 1, the probe may stop at 1165 positions to form a hemispherical surface seamlessly. In an example, the number of positions at which the probe stays to form the hemispherical surface seamlessly is not limited to 1165 as long as the adjacent positions of the probe in the longitudinal dimension and the latitudinal dimension can be overlapped with each other to form a seamless measurement area. The greater the number of positions is, the longer time taken to complete the entire test of leaking rays is. However, in case that the number of the positions is small, the seamless measurement area cannot be formed and the requirement of testing leaking rays cannot be satisfied. Thus, the testing efficiency can be improved by reducing the number of positions as much as possible in a case that the seamless measurement area can be formed.

Figure 3A:
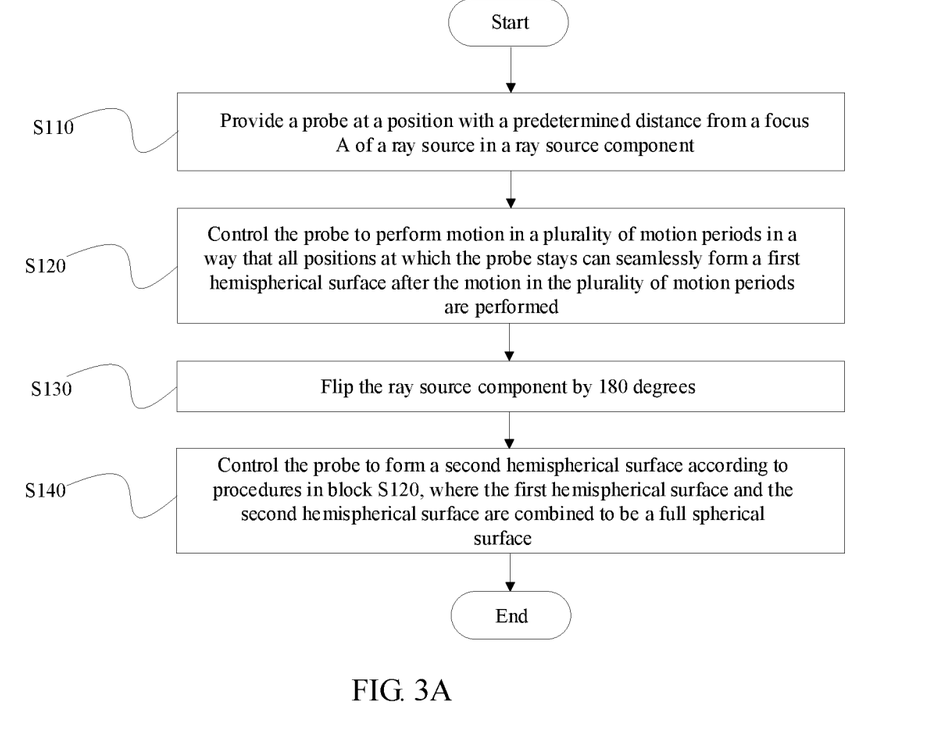
FIG. 3A is a flowchart illustrating a method of testing leaking rays according to an example of the present disclosure.

According to the above principle, a method of testing leaking rays is provided in an example of the present disclosure, which includes procedures in steps S110 to S140 in FIG. 3A.

At step S110, a probe is provided at a position with a predetermined distance from a focus A of a ray source in a ray source component.

At step S120, the probe is controlled to perform motion in a plurality of motion periods in a way that all positions at which the probe stays can seamlessly form a first hemispherical surface after the motion in the plurality of motion periods are performed, where the motion of the probe in each motion period may include the motion in the longitudinal dimension and the motion in the latitudinal dimension with the focus A of the ray source as the center of sphere.

At step S130, the ray source component is flipped by 180 degrees.

At step S140, the probe is controlled to form a second hemispherical surface according to procedures in step S120, where the first hemispherical surface and the second hemispherical surface are combined to be a full spherical surface.

When the probe stays at a particular position, the ray source emits rays and the probe measures a numerical value of leaking rays at the position. When the positions at which the probe stays seamlessly form the full spherical surface, the respective numerical values of leaking rays corresponding to all the positions within the coverage of the full spherical surface can be obtained. Thus, a leaking ray test for the ray source component is completed.

In each motion period, a measurement area in the longitudinal dimension and the latitudinal dimension is performed by performing motion on the two dimensions. After the motion is performed during a plurality of motion periods is completed, the respective measurement areas formed in all the motion periods can be spliced with each another to form a hemispherical surface, during which it is not desired to follow the sequence in the above principle shown in FIGS. 1 and 2.

When the probe is controlled to move according to the principle shown in FIGS. 1 and 2, the motion of the probe may be more regular in a way that it can be avoided to form a seam, and the testing efficiency can be further improved.

Further, a hemispherical surface described herein is not limited to a full hemispherical surface, for example, the formed hemispherical surface is larger than or smaller than the full hemispherical surface as long as the first hemispherical surface and the second hemispherical surface can be combined to be a full spherical surface. When test conditions permit, the first hemispherical surface and the second hemispherical surface may be equal parts.

Figure 3B:
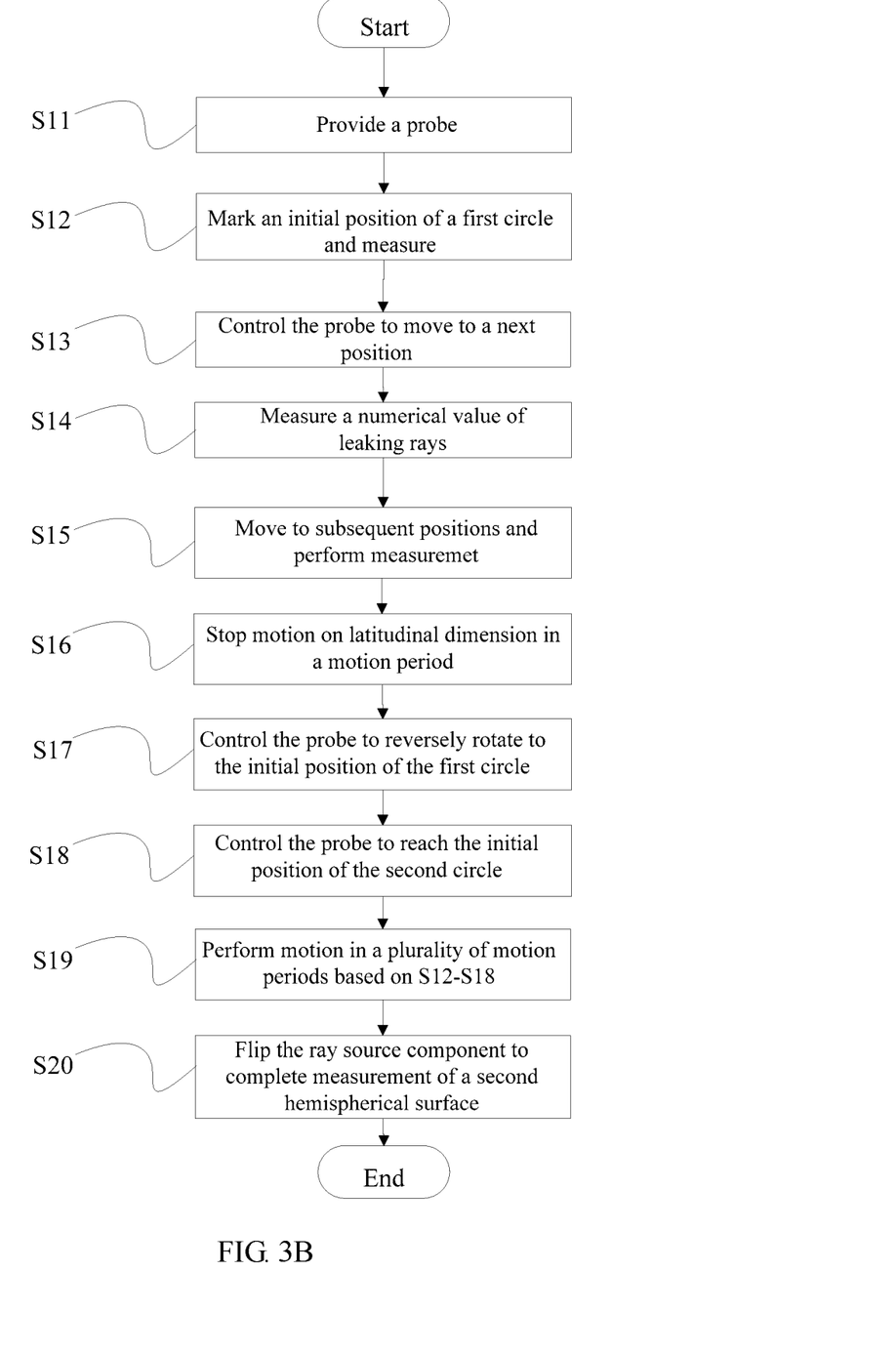
FIG. 3B is a flowchart illustrating a method of testing leaking rays according to an example of the present disclosure.

As shown in FIG. 3B, in conjunction with the motion way in FIGS. 1 and 2, and another motion way described above, a method of testing leaking rays is provided in an example of the present disclosure, which specifically include procedures as follows.

At step S11, a probe is provided at a position with a predetermined distance from a focus A of a ray source in a ray source component, where the predetermined distance may be 1 meter according to relevant regulations, which may further be changed accordingly as required by test.

At step S12, an initial position of the probe in a first motion circle is marked and a numerical value of leaking rays at the initial position is measured. In an example, the position labelled with 84 on the largest circle in FIG. 1 is taken as the initial position of the probe. After the test starts, the probe is located in the initial position, the ray source emits rays and the probe measures the numerical value of leaking rays at the initial position.

At step S13, the probe is controlled to arrive at a second position. In an example, the probe is controlled to rotate by a first predetermined angle around a vertical axis Y in a counter-clockwise or clockwise direction in the latitudinal dimension and stops rotating after reaching the second position, where there is an overlapping region between the second position and the initial position such that the two adjacent positions can form a seamless area in the latitudinal dimension.

At step S14, a numerical value of leaking rays at the second position is measured. In an example, in the second position, the ray source emits rays, and the probe measures the numerical value of leaking rays at the second position.

At step S15, the probe is controlled to reach subsequent positions in the latitudinal dimension according to the procedures in step S13 and to measure a numerical value of leaking rays at each of the subsequent positions according to the procedures in step S14 when staying at the subsequent position.

At step S16, the motion in the latitudinal dimension in a motion period is stopped. If the positions at which the probe stays seamlessly form a latitudinal arc which satisfies the measurement requirement in the latitudinal dimension in a first circle of motion period, the motion of the probe on the latitudinal dimension in the motion period ends. The latitudinal arc may be a full circular arc or a semicircular arc.

At step S17, the probe is controlled to reversely rotate to the initial position of the first circle.

At step S18, the probe is controlled to reach an initial position of a second circle. In an example, the probe is controlled to rotate around the horizontal axis X in a clockwise or counter-clockwise direction by a second predetermined angle in the longitudinal dimension from the initial position of the first circle to reach the initial position of the probe in the second circle. The probe completes the motion on the longitudinal dimension in one motion period.

At step S19, motion is performed in a plurality of motion periods according to procedures in steps S12-S18 until the positions at which the probe stays can seamlessly form a first hemispherical surface, and the measurement for numerical values of leaking rays at all the positions within the first hemispherical surface is completed.

At step S20, the ray source component is entirely rotated by 180 degrees and the procedures in steps S12-S19 are repeatedly performed to complete the measurement for numerical values of leaking rays at all the positions on a second hemispherical surface. The first hemispherical surface and the second hemispherical surface can be combined to be a full spherical surface, and the two measurement results of the first and second hemispherical surface can be combined to be measurement results of the full spherical surface.

At step S12, the initial position of the probe may be a point on the largest-diameter longitudinal arc of the first hemispherical surface. The probe moves toward the top of the sphere on the longitudinal dimension from the initial position of the hemispherical surface, thereby fast and effectively forming a hemispherical surface and improving controllability of the probe motion.

Another position may be selected as the initial position of the probe as long as it is any point on the desired spherical surface. The probe moves on the latitudinal dimension from the initial position to form a latitudinal arc. A full spherical surface is formed by cooperating with motion on the longitudinal dimension.

At step S13, when the probe completes a full circle of motion on the latitudinal dimension by performing rotation 84 times, the first predetermined angle by which the probe rotates each time may be 4.286 degrees. Thus, the test efficiency can be ensured when seamless area is performed.

In some cases, the first predetermined angle is related to a measurement range of the probe. When the measurement range of the probe is expanded, the first predetermined angle may be increased. Accordingly, the rotation times by which the probe can complete a full circle of measurement on the latitudinal dimension can be decreased, thereby further improving the test efficiency. Further, when the measurement range of the probe is narrowed, the first predetermined angle can be reduced accordingly, and the rotation times of the probe may be increased, thereby reducing the test efficiency.

At step S15, when the probe is controlled to reach each position on the latitudinal dimension according to procedures in step S13, the selected first predetermined angle may be same or different from that in step S13 as long as the adjacent positions of all the positions obtained on the latitudinal dimension can form the seamless spherical surface. The first predetermined angle may be a fixed value or a variable value, which may be selected according to the test requirements.

At step S16, the formed latitudinal arc in a motion period may be a full circular arc. In this case, the probe rotates by 360 degrees on the latitudinal dimension, for example, a full circle. Subsequently, the probe rotates a plurality of times to 90 degrees on the longitudinal dimension to form a hemispherical surface. When the formed latitudinal arc on a motion period is a semicircular arc, the probe rotates by 180 degrees in the latitudinal dimension, for example, half of a circle. Then, the probe rotates to 180 degrees on the longitudinal dimension to form a hemispherical surface.

At step S17, in each motion period, the probe may be controlled to reversely rotate to the initial position of the latitudinal arc corresponding to the motion period after the probe completes the motion on the latitudinal dimension. Since the probe may be connected with electrical lines, it may cause that the electrical lines are intertwined to affect normal testing when the probe continues to rotate at the position at which the motion ends on the latitudinal dimension. However, when the probe returns to the initial position after completing the motion in the latitudinal dimension each time, the above problem can be effectively avoided and the control accuracy for the motion of the probe can be improved.

In an example, the second predetermined angle may be equal to the first predetermined angle. In another example, the second predetermined angle is set according to the corresponding first predetermined angle as long as adjacent positions on the longitudinal dimension can be overlapped with each other to achieve the seamless area on the longitudinal dimension. Further, on the longitudinal dimension, the second predetermined angle may be a fixed value or a variable value.

In an example, the first predetermined angle and the second predetermined angle are smaller than a predetermined value that may range from 4 to 6 degrees. In another example, the first predetermined angle and the second predetermined angle are set according to the measurement range of the probe to avoid a seam between adjacent positions due to a large rotation angle of the probe at each time.

At steps S11-S20 above, the circle may be used to define different latitudinal arcs, e.g., the first circle and the second circle, the concept of circles can be used to indicate that the probe starts circular motion on the latitudinal dimension, rather than that the probe moves a full circle on the latitudinal dimension. A specific rotation angle may be set according to requirements, e.g., the formed latitudinal arc is a full circular arc, a semicircular arc, or a quarterly circular arc, etc.

When the motion on the longitudinal dimension is performed and the rotation direction is selected, the rotation direction of the probe may not be changed. For example, the rotation direction of the probe on the longitudinal dimension may be fixed. After the rotation direction on the longitudinal dimension is fixed, the probe may perform coverage of the hemispherical surface circle by circle. Thus, repeated measurement or blind angle for measurement can be avoided, and measurement reliability and the measurement efficiency can be improved.

Based on the above, a device for testing leaking rays is provided according to an example of the present disclosure. The device for testing leaking rays is disposed according to the above method of testing leaking rays, and configured to perform the above method of testing leaking rays.

Figure 4:
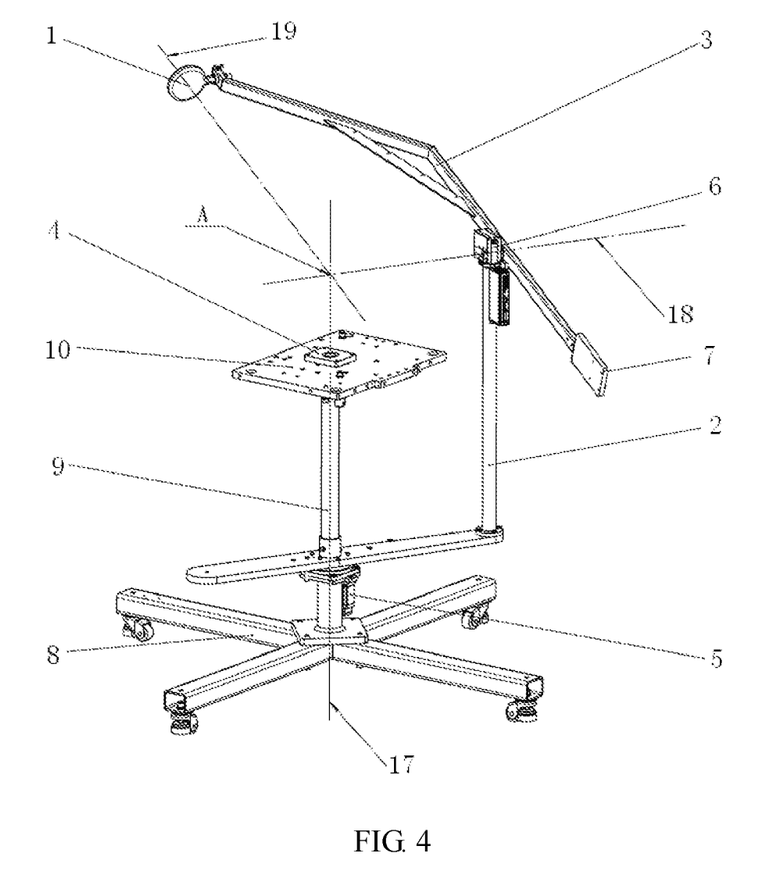
FIG. 4 is a schematic diagram illustrating a structure of a device for testing leaking rays according to an example of the present disclosure.
Figure 5:
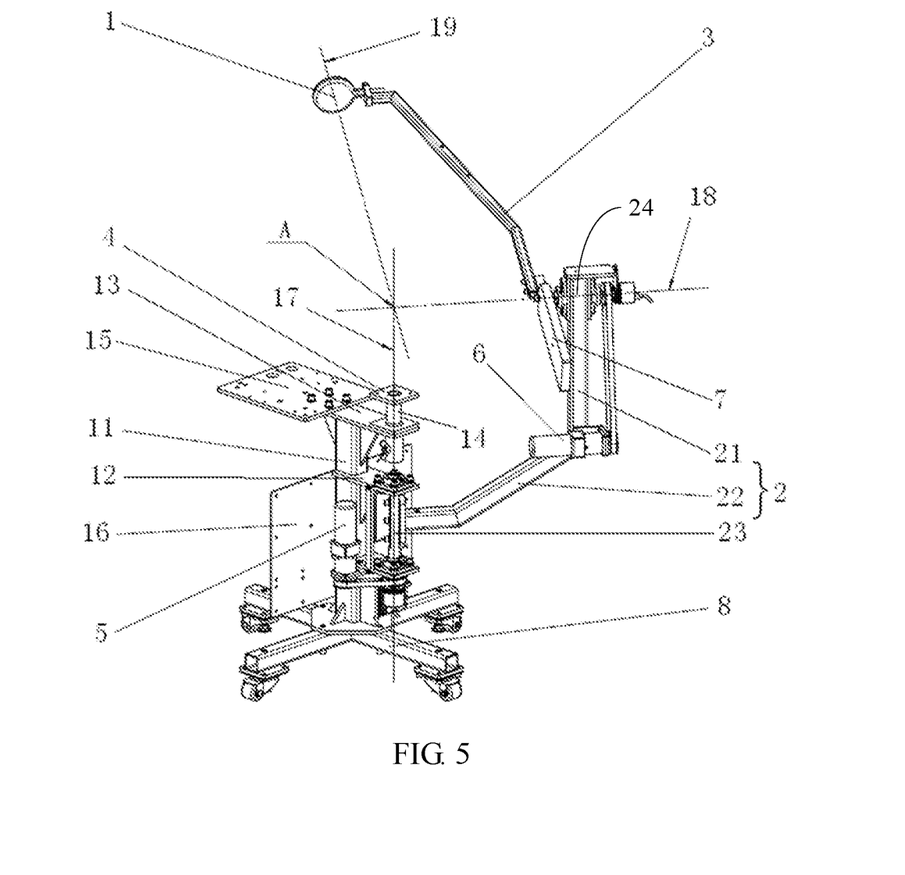
FIG. 5 is a schematic diagram illustrating a structure of a device for testing leaking rays according to another example of the present disclosure.

FIG. 4 is a schematic diagram illustrating a structure of a device for testing leaking rays according to an example of the present disclosure. FIG. 5 is a schematic diagram illustrating a structure of a device for testing leaking rays according to another example of the present disclosure. As shown in FIGS. 4 and 5, the device for testing leaking rays includes a first rotary arm 2, a second rotary arm 3, a first driving unit 5, a second driving unit 6, a probe 1, and a mounting base 4 for mounting a ray source component. The first driving unit 5 may be configured to drive the first rotary arm 2 to rotate around a first rotary axis 17. The second driving unit 6 may be configured to drive the second rotary arm 3 to rotate around a second rotary axis 18. An end of the first rotary arm 2 is rotatably connected to the mounting base 4 and the other end is rotatably connected to an end of the second rotary arm 3. The other end of the second rotary arm 3 may be a rotating end rotating relative to the second rotary axis 18. The probe 1 may be mounted at the rotating end of the second rotary arm 3 to measure a numerical value of leaking rays at each position at which the probe 1 stays.

The first rotary axis 17 of the first rotary arm 2 is perpendicular to the second rotary axis 18 of the second rotary arm 3. The first rotary axis 17 and the second rotary axis 18 intersect with a body axis of the probe 1 at a focus A of a ray source in the ray source component. The probe 1 may have a predetermined distance from the focus A. When the first rotary arm 2 and the second rotary arm 3 drive the probe 1 to rotate, rotation points of the probe 1 are distributed on a spherical surface with a center of sphere being the focus A and the radius being the predetermined distance. Moreover, since the first rotary axis 17 of the first rotary arm 2 is perpendicular to the second rotary axis 18 of the second rotary arm 3, the first rotary arm 2 and the second rotary arm 3 can rotate to drive the probe 1 to move in a latitudinal dimension and a longitudinal dimension, respectively. If the rotation around the first rotary axis 17 of the first rotary arm 2 is taken as a motion on the latitudinal dimension, the rotation around the second rotary axis 18 of the second rotary arm 3 may be taken as a motion on the longitudinal dimension. Based on cooperation of the first rotary arm 2 and the second rotary arm 3, the probe 1 may be driven to move in the longitudinal dimension and the latitudinal dimension, respectively, so that positions where the probe 1 stays may envelope into a full spherical surface.

The probe 1 may be provided at an outermost end that is on the second rotary arm 3 and far away from the focus A. The rotary radius of the second rotary arm 3 may be equal to the predetermined distance. The mounting position of the probe 1 is adjusted on the second rotary arm 3 according to requirements as long as the second rotary arm 3 can drive the probe 1 to perform rotation based on the radius of the predetermined distance. However, the value of the rotary radius of the second rotary arm 3 is not limited to be equal to the predetermined distance.

The rotary radius of the first rotary arm 2 may be set as desired. In a case that there is no interference for the rotary motion, the rotary radius of the first rotary arm 2 is as small as possible to reduce the rotational inertia of the first rotary arm 2 in the rotary process, reduce the load of the first driving unit 5 and improve the stable reliability of rotation.

In an example, the rotation of the first rotary arm 2 may be controlled by the first driving unit 5, and the rotation of the second rotary arm 3 may be controlled by the second driving unit 6. When the probe 1 is driven by the rotation of the first rotary arm 2 to be at a particular position of the latitudinal dimension, the probe 1 may be controlled to stay at the position and the ray source in the ray source component may be controlled to perform emission, so that the probe 1 can measure a numerical value of leaking rays at the position. When the probe 1 is driven by the rotation of the second rotary arm 3 to be at a particular position of the longitudinal dimension, the probe 1 may be controlled to stay at the position and measure a numerical value of leaking rays at the position. Thus, when the positions at which the probe 1 stays form a full spherical surface seamlessly, the leaking ray test for the ray source component is completed.

The predetermined distance and the specific test method may be similar with that in the method of testing leaking rays in examples of the present disclosure, which is not repeatedly described herein.

In some examples, the latitudinal arcs in different methods of testing leaking rays may be different in each motion period. In some examples, the latitudinal arcs may be a full circular arc or a semicircular arc.

In an example, as shown in FIG. 4, the first rotary arm 2 may be of L-shape and have a transverse part hinged to the mounting base 4 and a vertical part hinged to the second rotary arm 3. The vertical part of the first rotary arm 2 may be perpendicular to the second rotary axis 18 of the second rotary arm 3, and the first rotary axis 17 of the first rotary arm 2 is in a direction parallel to the vertical part.

The device for testing leaking rays is further provided with a column 9 and a support plate 10. The central axis of the column 9 coincides with the first rotary axis 17 of the first rotary arm 2. The lower end of the column 9 is hinged to the transverse part of the first rotary arm 2. The column 9 may be taken as the first rotary axis 17 of the first rotary arm 2. The support plate 10 is provided at the upper end of the column 9. The mounting base 4 is detachably provided on the support plate 10. According to the structure, rotatable connection of the first rotary arm 2 and the mounting base 4 can be implemented. Further, in a measuring process, the support plate 10 on the column 9, the mounting base 4 mounted on the support plate 10 and the ray source component can all remain stationary. The motion of the probe relative to the ray source component on the latitudinal dimension can be achieved by driving the first rotary arm 2 to rotate relative to the column 9 through the first driving unit 5.

In the example, the rotary axis at which the column 9 is located may correspond to the vertical axis Y in the testing method above, and the column 9 may extend from top to bottom. When rotating, the first rotary arm 2 may drive the probe 1 to move on the latitudinal dimension.

The mounting base 4 and the support plate 10 are detachably connected with each other. It can be ensured that the focus A of the ray source in the ray source component mounted on the mounting base 4 is in the central axis of the column 9 by controlling the mounting position of the mounting base 4 on the support plate 10, thereby improving mounting convenience and use convenience.

For different ray source components, the mounting bases 4 may have different shapes or structures. Further, for two respective states for the same ray source component before and after being entirely rotated by 180 degrees, the mounting base 4 may have two different shapes or structures. In an example, when the ray source is below the beam limiter, the mounting base 4 may be a rectangular flat plate structure with a specific thickness and a circular through hole in the central part as shown in FIG. 4. The tested ray source component is fixedly mounted on the mounting base 4, and the relative positions of the mounting base 4 and the tested ray source component are fixed.

Since the column 9 supports the bottom of the mounting base 4, the probe 1 can perform measurement on a measuring range covered by a hemispherical surface when the relative positions of the ray source and the beam limiter in the ray source component are not changed. When the measurement of the hemispherical surface is completed, the ray source component may be entirely rotated by 180 degrees, and the rotated ray source component can be mounted by replacing the mounting base 4. In an example, the mounting of the ray source component before and after being rotated can be implemented by replacing the mounting base 4, so as to better meet measurement requirements and improve measurement efficiency. Further, for ray source components with different structures, the mounting bases 4 with different structures can be selected, thereby improving universality.

As shown in FIG. 4, in an example, the first rotary arm 2 is hinged to the column 9 through the central portion of the transverse part of the first rotary arm 2. The rotating torque induced by the second rotary arm 3 hinged to the vertical part of the first rotary arm 2 can be balanced, thereby improving the motion stability of the first rotary arm 2.

Further, the support plate 10 may be configured to mount accessories used for testing leaking rays, such as a high-voltage cabin, a power source and a control circuit board. The mounted accessories may be together near the column 9 without interference with the rotation of the first rotary arm 2 around the column 9. The support plate 10 may be a rectangular flat plate structure with a specific thickness.

The first rotary axis 17 may correspond to the vertical axis Y in FIG. 1, and the second rotary axis 18 may correspond to the horizontal axis X in FIG. 1. The first rotary axis 17 is the rotation axis of the first rotary arm 2, and the second rotary axis 18 is the rotation axis of the second rotary arm 3, and a third axis 19 is the body axis of the probe 1. In an operation process of the device, the first rotary axis 17, the second rotary axis 18 and the third axis 19 intersect at a point no matter regardless whether the probe 1 is in motion or stationary. The point coincides with the focus A of the ray source of the tested ray source component. By replacing different mounting bases 4 of the ray source component, it can be ensured that the focuses A of the fixedly-mounted ray source components always coincide with the above intersecting point regardless which type of ray source component is used and whether the ray source component have the structural that the ray source is below or above the beam limiter.

The device for testing leaking rays may further include a supporting base 8 configured to support another part of the device for testing leaking rays. The supporting base 8 may contact with the ground and include a caster and a supporting structure in a way that it can be replaced between the caster and the supporting structure. When the support is given by the caster, the supporting base 8 may set the whole device for testing leaking rays to move. When the test is desired, the caster is replaced by the supporting structure to contact with the ground for support, so that the device for testing leaking rays remains stationary to facilitate testing.

There are different structures for the supporting base 8. In an example, the body of the supporting base 8 may be a cruciform structure welded with square tubes. Four ends which are on the cruciform structure and far away from the center of the cruciform structure are fixedly connected to four casters with the supporting structure, respectively. When wheels on the casters contact with the ground, the supporting structure are separated from the ground, and the device for testing leaking rays can move freely on the ground. When the supporting structure contacts with the ground, the casters are separated from the ground, and the relative position of the device to the ground are fixed.

In an example, to achieve support, the column 9 may be a long round tube structure with a square base welded to the bottom of the column 9. The square base is fixedly connected to the central portion of the cruciform structure of the supporting base 8. The long round tube structure may be hinged to the middle portion of the first rotary arm 2 with a hinge point above the square base. The hinge point may be provided close to the square base with no interference in a way that centers of gravity of the first rotary arm 2 and the support plate 10 can be lowered. The axis of the long round tube structure coincides with the first rotary axis 17 perpendicular to the ground, and passes through the center of the cruciform structure of the supporting base 8 to improve the rotary and supporting stability.

To facilitate the motion and stop of the probe 1, the first rotary arm 2 may be positioned at any rotation position of the first driving unit 5, and the first driving unit 5 may continue to drive the probe 1 to rotate to a next measurement position after the probe 1 completes measurement at the position. Further, the second rotary arm 3 may be positioned at a rotation position of the second driving unit 6, and the second driving unit 6 may continue to drive the probe 1 to rotate to a next measurement position after the probe 1 completes measurement at the position.

The first driving unit 5 may be located at a side of the first rotary axis 17, as shown in FIG. 4. The first driving unit 5 may not occupy a mounting space in the vertical direction so that the mounting height of the support plate 10 can be lowed as much as possible, thereby lowering the center of gravity of the whole testing device.

By being driven by the first driving unit 5, the first rotary arm 2 can rotate freely at any angle relative to the column 9 around the first rotary axis 17. The first driving unit 5 may adopt any device or structure combination capable of driving rotation motion. In an example, the first driving unit 5 may be a combination structure of a step motor and a speed reducer. The step motor and the speed reducer are fixedly connected. The body of the speed reducer is fixedly connected to a square flange welded on the column 9, and the relative positions of the body of the step motor and the square flange welded on the column 9 are fixed. The rotatable part of the speed reducer (e.g., a rotating shaft of the speed reducer) is fixedly connected to the transverse part of the first rotary arm 2, and the relative positions of the rotatable part of the speed reducer and the transverse part of the first rotary arm 2 are fixed. With the connection position, the first rotary arm 2 can be free when rotating around the first rotary axis 17 without any interference.

The second driving unit 6 may be located at a side which is on the second rotary arm 3 and faces the focus A. The rotational inertia in the rotary process of the first rotary arm 2 can be lowered, the load of the first driving unit 5 can be reduced, and the stable reliability of rotation can be improved.

Driven by the second driving unit 6, the second rotary arm 3 can rotate freely relative to the first rotary arm 2 around the second rotary axis 18. The second driving unit 6 may adapt a device or structure combination capable of driving rotation motion. In an example, the second driving unit 6 may be a rotational electric cylinder. A body of the rotational electric cylinder is fixedly mounted at the top of the vertical part of the first rotary arm 2. The rotatable part of the rotational electric cylinder (e.g., a rotating shaft of the rotational electric cylinder) is fixedly connected to the second rotary arm 3. With the connection position, a distance between the probe 1 and the focus A may be a predetermined distance.

The second rotary arm 3 and the probe 1 are fixedly connected to each other. The probe 1 may be a round structure with a handle and include a round part and a mounting handle. The round part may be an oblate cylinder structure with a particular thickness. The mounting handle may be a long cylinder structure, and the probe 1 may be connected to the second rotary arm 3 through the mounting handle. The second rotary arm 3 may be a bend-line-shaped slender rod and an end of the second rotary arm 3 is fixedly connected to the mounting handle of the probe 1 to form the rotating end, and the other end is fixedly connected to a counterweight 7 for balances. The counterweight 7 may include a counterweight plate.

The device for testing leaking rays as shown in FIG. 4 may implement leaking ray test based on the following procedures.

When a position labelled to be 84 in the largest circle in FIG. 1 is taken as an initial position of a first circle of motion of the probe 1, the position of the first rotary arm 2 is set as a zero position, and the second rotary arm 3 is in a horizontal state. After the test starts, the probe 1 is in the initial position, the ray source is controlled to emit rays, and the probe 1 measures a numerical value of leaking rays at the initial position. The second rotary arm 3 remains stationary, the first rotary arm 2 rotates 4.286° counter-clockwise around the first rotary axis 17 and stops rotating when the probe 1 reaches a second position. The ray source is controlled to emit rays, and the probe 1 measures a numerical value of leaking rays at the second position. The first rotary arm 2 continues to rotate 4.286°, and stops rotating after the probe 1 reaches a third position. The ray source is controlled to emit rays, and the probe 1 measures a numerical value of leaking rays at the third position. The first rotary arm 2 rotates 83 times counter-clockwise in sequence to complement the first circle of measurement of 84 positions. The first rotary arm 2 reversely rotates back to the zero position.

Before a second circle of measurement starts, e.g., before a next motion period starts, the second rotary arm 3 first rotates 4.286° around the second rotary axis 18 clockwise from the horizontal position in the first circle of measurement and stops. The probe 1 is located in the initial position of the second circle of measurement, the ray source is controlled to emit rays, and the probe 1 measures a numerical value of leaking rays at the initial position of the second circle. When the second rotary arm 3 remains stationary, the first rotary arm 2 rotates 4.286° around the first rotary axis 17 and stops rotating when the probe 1 reaches a second position of the second circle. The ray source is controlled to emit rays, and the probe 1 measures a numerical value of leaking rays at the second position of the second circle. The first rotary arm 2 continues to rotate 4.286° and stops rotating when the probe 1 reaches a third position of the second circle. The ray source is controlled to emit rays, and the probe 1 measures a numerical value of leaking rays at the third position of the second circle. The second circle of measurement for 84 positions can be completed when the first rotary arm 2 rotates 83 times in sequence. The first rotary arm 2 reversely rotates back to the zero position. Before each subsequent circle of measurement starts, the second rotary arm 3 firstly continues to rotate 4.286° around the second rotary axis 18 on the basis of the previous position and stops as the initial position of this circle for the probe 1. The first rotary arm 2 performs rotation measurement by an angle calculated based on the number of the labelled positions of each circle in FIG. 1. When the second rotary arm 3 rotates the 21th time, the probe 1 is located at the top of the hemisphere which is the last position of the hemispherical surface measurement, and the hemispherical surface measurement is completed when the measurement at this position is finished. After the ray source component is entirely rotated by 180° and fixedly mounted by using the corresponding mounting base 4, the previous testing process is repeated to complete the measurement of the other hemispherical surface. The two measurement results of the hemispherical surfaces are combined to be measurement results of a full spherical surface.

In an example, as shown in FIG. 5, the first rotary arm 2 may be bend-line-shaped which includes a first arm 21 and a second arm 22 connected with each other. The first arm 21 may extend from top to bottom. The second arm 22 may be bent from the lower end of the first arm toward the first rotary axis 17. An upper end of the first arm 21 is hinged to the second rotary arm 3. A left end of the second arm 22 is connected to a rotating shaft 23 extending upward and downward. An axis of the rotating shaft 23 may be the first rotary axis 17 of the first rotary arm 22. In an example, the rotating shaft 23 can rotate relative to the mounting base 4 to implement the rotation of the first rotary arm 2 relative to the mounting base 4. Further, the mounting base 4 is located directly above the rotating shaft 23 to ensure that the axis of the rotating shaft 23 can pass through the focus A of the ray source mounted on the mounting base 4.

In an example, the device for testing leaking rays may further include a supporting beam 11 at a side of the rotating shaft 23. The supporting beam 11 may include at least two rotating plates 12. The different rotating plates 12 are distributed at a spacing in the upward and downward direction. There are at least two rotating plates respectively connected rotationally to an upper end and a lower end of the rotating shaft to implement the rotation of the first rotary arm 2 relative to the supporting beam 11. The supporting beam 11 implements rotational support for the first rotary arm 2.

Further, the supporting beam 11 may further include a connecting plate 13. The connecting plate 13 may extend toward the first rotary axis 17 and may be provided with a supporting shaft 14 disposed coaxially with the rotating shaft 23. The supporting shaft 14 is independent of the rotating shaft 23 and configured to support the mounting base 4. The mounting base 4 may be disposed at the top of the supporting shaft 14. Support positioning for mounting base 4 is implemented through cooperation of the supporting beam 11 and the connecting plate 13. Further, rotational support for the first rotary arm 2 is achieved by the rotating plate 12, and the relative positions and the connection relation of the ray source component and the first rotary arm 2 are ensured due to the position configuration of the supporting shaft 14 and the rotating shaft 23.

When the supporting beam 11 is used for positioning support, an accessory mounting plate 15 away from the first rotary axis 17 may further be provided for mounting accessories desired for testing leaking rays, such as a high-voltage cabin. The accessories are concentrated in a direction away from the rotating shaft 23 without interference for the rotation of the first rotary arm 2 around the rotating shaft 23 within the range of 180 degrees.

On the support beam 11, an electrical mounting plate 16 may further be disposed at a side face far away from the rotating shaft 23. The electrical mounting plate 16 may be a rectangular thin plate and be configured to mount a power source and a control circuit board for testing leaking rays, so as to facilitate centralized processing and control for circuits and further reduce a burden of the accessory mounting plate 15. By setting a mounting space at the side face of the supporting beam 11, it can be avoided to impact the rotational angle of the first rotary arm 2 on the latitudinal dimension due to excessively centralization of accessories.

Because many components are desired for testing leaking rays and the connecting circuits are complex, it is difficult to put the components and connection circuits within a specific radius such that the device for testing leaking rays shown in FIG. 4 cannot be used to test leaking rays in some conditions.

Based on this, in the device for testing leaking rays shown in FIG. 5, the components and circuits desired for testing leaking rays are concentrated together at a side away from the rotating shaft 23, and the space at the side may be another 180-degree space opposite to the 180-degree space range desired for the rotation of the first rotary arm 2. In an example, in FIG. 5, the rotating space and the mounting space can be divided in the latitudinal dimension. In an example, the mounting space is set at the side away from the rotating shaft 23 and the first rotary arm 2, and another 180-degree space is set as the rotating space for the first rotary arm 2. The test in a hemispherical surface may be completed through 180-degree rotation of the second rotary arm.

The device for testing leaking rays as shown in FIG. 5 may implement the test based on the following procedures.

A position labelled to be 84 on the largest circle in FIG. 1 is taken as an initial position of a first circle of motion of the probe 1. The position of the first rotary arm 2 is set as a zero position, and the second rotary arm 3 is in a horizontal state. When the test starts, the probe 1 is in the initial position of the first circle of motion, the ray source is controlled to emit rays, and the probe 1 measures a numerical value of leaking rays at the initial position. The second rotary arm 3 remains stationary, the first rotary arm 2 rotates 4.286° counter-clockwise around the first rotary axis 17 and stops rotating when the probe 1 reaches a second position. The ray source is controlled to emit rays, and the probe 1 measures a numerical value of leaking rays at the second position. The first rotary arm 2 continues to rotate 4.286° and stops rotating when the probe 1 reaches a third position. The ray source is controlled to emit rays, and the probe 1 measures a numerical value of leaking rays at the third position. The first semicircle of measurement of 42 positions can be completed when the first rotary arm 2 rotates 41 times counter-clockwise in sequence, and the first rotary arm 2 reversely rotates back to the zero position. Before the second semicircle of measurement starts, e.g., before a next motion period starts, the second rotary arm 3 first rotates 4.286° around the second rotary axis 18 clockwise from the horizontal position in the first semicircle of measurement and then stops in a way that the probe 1 is located in the initial position of the second semicircle of measurement. The ray source is controlled to emit rays, and the probe 1 measures a numerical value of leaking rays at the initial position of the second semicircle. The second rotary arm 3 remains stationary, the first rotary arm 2 rotates 4.286° around the first rotary axis 17 and stops rotating when the probe 1 reaches a second position of the second semicircle. The ray source is controlled to emit rays, and the probe 1 measures a numerical value of leaking rays at the second position of the second semicircle. The first rotary arm 2 continues to rotate 4.286° and stops rotating when the probe 1 reaches a third position of the second semicircle. The ray source is controlled to emit rays, and the probe 1 measures a numerical value of leaking rays at the third position of the second semicircle. The second semicircle of measurement of 42 positions can be completed when the first rotary arm 2 rotates 41 times in sequence, and the first rotary arm 2 reversely rotates back to the zero position. Before each subsequent semicircle of measurement starts, the second rotary arm 3 firstly continues to rotate 4.286° around the second rotary axis 18 on the basis of the previous position, and stops as the initial position of the circle for the probe 1. Then, the first rotary arm 2 rotates for measurement by an angle calculated based on the number of the labelled positions of each circle in FIG. 1. When the second rotary arm 3 rotates for the 21th time, the probe 1 is located at the top of the hemisphere, e.g., the last position for quarterly hemispherical surface measurement, and the quarterly hemispherical surface measurement is completed when the measurement at the position ends. The ray source component is entirely rotated by 180°, and fixedly mounted by using the corresponding mounting base 4. The previous testing process is repeated so as to complete the measurement of the other hemispherical surface. The two measurement results are combined to be a full spherical surface.

The device for testing leaking rays shown in FIG. 5 may be different from the device for testing leaking rays shown in FIG. 4 in relevant structures such as the supporting beam 11 above, and another part of the device may be set similar with that on the device for testing leaking rays shown in FIG. 4.

In an example, the device for testing leaking rays shown in FIG. 5 may include a supporting base 8. A structure of the supporting base 8 may be similar with that in the device shown in FIG. 4. However, considering that the structure of the supporting beam 11 is different from the structure of the column 9 in FIG. 4, the structures for implementing connection of the supporting beam 11 and the supporting base 8 may different.

In an example, the body of the supporting beam 11 may be a long rectangular tube structure with a square base welded on the bottom of the supporting beam 11. The square base is fixedly connected to the central portion of the cruciform structure of the supporting base 8. Two rectangular plates with a particular spacing and a particular thickness are welded to the central region in a length direction of the long rectangular tube structure, which are as rotating plates 12. Two bearings are fixedly connected to two rotating plates 12, respectively. Axes of the two bearings respectively coincide with the first rotary axis 17 to implement connection with the rotating shaft 23 of the first rotary arm 2.

When being driven by the first driving unit 5, the first rotary arm 2 can freely rotate relative to the supporting beam 11 around the first rotary axis 17 at any angle within the range of 180 degrees.

In some examples, the first driving unit 5 may be located at a side of the first rotary axis 17, and may be any device or structure combination capable of driving rotation motion. In an example, the first driving unit 5 may be a structure including a servo motor and a speed reducer, and may implement rotational drive for the first rotary arm 2 in conjunction with a synchronous belt and two synchronous wheels.

When being combined, the servomotor and the speed reducer are fixedly connected to a side face of the long rectangular tube structure of the supporting beam 11 in the vertical direction. The servomotor is located above the speed reducer. An end of the speed reducer is fixedly connected with a synchronous wheel as a driving wheel. A synchronous wheel is further disposed as a driven wheel at the lower end of the rotating shaft 23. Transmission between the two synchronous wheels is implemented through the synchronous belt.

In the bend-line structure of the first rotary arm 2, two side faces on the top of the first arm 21 and along the direction of the first rotary axis 17 are fixedly connected with two bearings, respectively. The two bearings together support a horizontal rotating shaft 24 parallel to the ground and perpendicular to the first rotary axis 17. The axial direction of the horizontal rotating shaft 24 may constitute the second rotary axis 18. An end on the second rotary axis 18 and close to the first rotary axis 17 is fixedly connected with the second rotary arm 3. With the connecting position, a distance between the probe 1 and the focus A may be a predetermined distance, which may be 1 meter.

Driven by the second driving unit 6, the second rotary arm 3 can freely rotate relative to the first rotary arm 2 around the second rotary axis 18.

In an example, the second driving unit 6 may be located at a side which is on the second rotary arm 3 and toward the focus A. The second driving unit 6 may be any device or structure combination capable of driving rotational motion. In an example, the second driving unit 6 may be a combined structure of a servomotor and a speed reducer, and may implement rotational drive for the second rotary arm 3 in conjunction with a synchronous belt and two synchronous wheels.

The servomotor and the speed reducer may be fixedly connected to a side face of the first arm 21 in the horizontal direction. The servomotor is located at a side close to the first rotary axis 17, and the speed reducer is located at a side far away from the first rotary axis 17. An end of the speed reducer is fixedly connected to one synchronous wheel. A side which is on the horizontal rotating shaft 24 and is far away from the first rotary axis 17 is fixedly connected to another synchronous belt. The two synchronous wheels are connected through a synchronous belt in a way that the second driving unit 6 transfers power to the second rotary axis 18.

Further, in the example, aspects such as the structure and the connection way of the probe 1 may be set similar with that in the device for testing leaking rays shown in FIG. 4, which is not to be redundantly described herein.

It should be noted that upward and downward directions mentioned herein can be directions perpendicular to a ground when a device for testing leaking rays normally operates. In an example, the direction pointing to the ground is the downward direction, and the direction away from the ground is the upward direction. The upward and downward directions mentioned herein are same as a vertical direction. A horizontal direction mentioned herein can be any direction in a plane perpendicular to the vertical direction.

The terms "first", "second" and the like used herein are just used to differentiate two or more same or similar structures or two or more components with the same or similar structures and do not indicate specific limitation to sequence.

The above are detailed descriptions of a method and device for testing leaking rays provided in the present disclosure. Specific examples are used herein to set forth the principles and the implementing methods of the present disclosure, and the descriptions of the above examples are only meant to help understanding of the core idea of the present disclosure. It should be pointed out that those of ordinary skill in the art can make numerous improvements and modifications to the present disclosure without departing from the principle of the present disclosure and these improvements and modifications may also fall into the scope of protection of claims of the present disclosure.

What is claimed is:

1. A device for testing leaking rays, the device comprising:
    a first rotary arm configured to rotate around a first rotary axis;
    a second rotary arm rotatably connected with the first rotary arm and configured to rotate around a second rotary axis;
    a probe mounted on a rotating end of the second rotary arm and configured to measure a numerical value of leaking rays at each position at which the probe stays;
    a mounting base rotatably connected with the first rotary arm and configured to mount a ray source component;
    a first driver configured to drive the first rotary arm to rotate around the first rotary axis; and
    a second driver configured to drive the second rotary arm to rotate around the second rotary axis,
    wherein the first rotary axis is perpendicular to the second rotary axis, the first rotary axis and the second rotary axis intersect with a body axis of the probe at a focus of a ray source in the ray source component, and the probe is at a predetermined distance from the focus.

2. The device of claim 1, wherein the first driver is configured to position the first rotary arm at a first rotation position, and
    wherein the second driver is configured to position the second rotary arm at a second rotation position.

3. The device of claim 1, wherein the second rotary arm is provided with a counterweight for balance at an end opposite to the rotating end on the second rotary arm.

4. The device of claim 1, wherein the first rotary arm is of an L shape and comprises a transverse part and a vertical part,
    wherein the transverse part is hinged to the mounting base, and the vertical part is hinged to the second rotary arm and perpendicular to the second rotary axis of the second rotary arm.

5. The device of claim 4, further comprising a column and a support plate disposed at a top of the column,
   wherein a central axis of the column coincides with the first rotary axis of the first rotary arm, a lower end of the column is hinged to the transverse part of the first rotary arm, and the mounting base is detachably disposed on the support plate.

6. The device of claim 1, wherein the first rotary arm is of a bend-line shape and comprises a first arm extending from top to bottom and a second arm bent from a lower end of the first arm toward the first rotary axis,
   wherein an upper end of the first arm is hinged to the second rotary arm, and
   wherein an end of the second arm close to the first rotary axis is connected with a rotating shaft extending upward and downward, and an axis of the rotating shaft extending upward and downward is collinear with the first rotary axis.

7. The device of claim 6, further comprising a supporting beam at a side of the rotating shaft,
   wherein the supporting beam is provided with at least two rotating plates spaced apart in an upward and downward direction, and the rotating plates are respectively connected rotationally to an upper end and a lower end of the rotating shaft.

8. The device of claim 7, wherein the supporting beam is further provided with a connecting plate extending toward the first rotary axis,
   wherein the connecting plate is provided with a supporting shaft disposed coaxially with the rotating shaft and independent of the rotating shaft, and
   wherein the mounting base is disposed at a top of the supporting shaft.

9. The device of claim 7, wherein the supporting beam is further provided with an accessory mounting plate disposed away from the first rotary axis and configured to mount an accessory for testing leaking rays.

10. The device of claim 7, further comprising an electrical mounting plate at a side face of the supporting beam far away from the rotating shaft,
    wherein the electrical mounting plate is configured to mount a power source and a control circuit board for testing leaking rays.

11. The device of claim 1, wherein the first driver and the second driver are configured to drive the first rotary arm and the second rotary arm to thereby:
    drive the probe to move on a longitudinal dimension and a latitudinal dimension by taking the focus as a center of a sphere in a plurality of first motion periods such that positions at which the probe stays seamlessly form a first hemispherical surface; and
    when the ray source component is flipped after the first hemispherical surface is formed, drive the probe to move on the longitudinal dimension and the latitudinal dimension by taking the focus as the center of the sphere in a plurality of second motion periods such that positions at which the probe stays seamlessly form a second hemispherical surface, wherein the second hemispherical surface and the first hemispherical surface are combinable to be a full spherical surface.

12. The device of claim 11, wherein the first driver is configured to, in each of the first motion periods, drive the first rotary arm to thereby drive the probe to rotate by a first predetermined angle for a plurality of times on the latitudinal dimension such that the positions at which the probe stays form a seamless latitudinal arc, and
    wherein the second driver is configured to, in each of the first motion periods, drive the second rotary arm to thereby drive the probe to rotate by a second predetermined angle on the longitudinal dimension.

13. The device of claim 12, wherein the latitudinal arc is a semicircular arc or a full circular arc.

14. The device of claim 12, wherein the focus is taken as the center of the sphere, and a point on a largest-diameter circle of the full spherical surface is set to be an initial position of the probe.

15. The device of claim 12, wherein the first driver is configured to, in each of the first motion periods, drive the first rotary arm to thereby drive the probe to reversely rotate to a starting point of the latitudinal arc when the latitudinal arc is formed.

16. The device of claim 12, wherein the second driver is configured to drive the second rotary arm to thereby drive the probe to rotate by the second predetermined angle in a selected rotation direction on the longitudinal dimension.

17. The device of claim 11, wherein the first driver is configured to, in each of the second motion periods, drive the first rotary arm to thereby drive the probe to rotate by a first predetermined angle for a plurality of times on the latitudinal dimension such that the positions at which the probe stays form a seamless latitudinal arc, and
    wherein the second driver is configured to, in each of the second motion periods, drive the second rotary arm to thereby drive the probe to rotate by a second predetermined angle in a selected rotation direction on the longitudinal dimension.

18. The device of claim 17, wherein the focus is taken as the center of the sphere, and a point on a largest-diameter circle of the full spherical surface is taken as an initial position of the probe.

19. The device of claim 17, wherein the first driver is configured to, in each of the second motion periods, drive the first rotary arm to thereby drive the probe to reversely rotate to a starting point of the latitudinal arc when the latitudinal arc is formed.

20. The device of claim 11, wherein adjacent positions of the probe in the longitudinal dimension and the latitudinal dimension are overlapped with each other to form a seamless measurement area.

\* \* \* \* \*